Jan. 14, 1941.   M. E. NORTON   2,228,841
PACKING ARRANGEMENT
Filed May 26, 1939   2 Sheets-Sheet 1
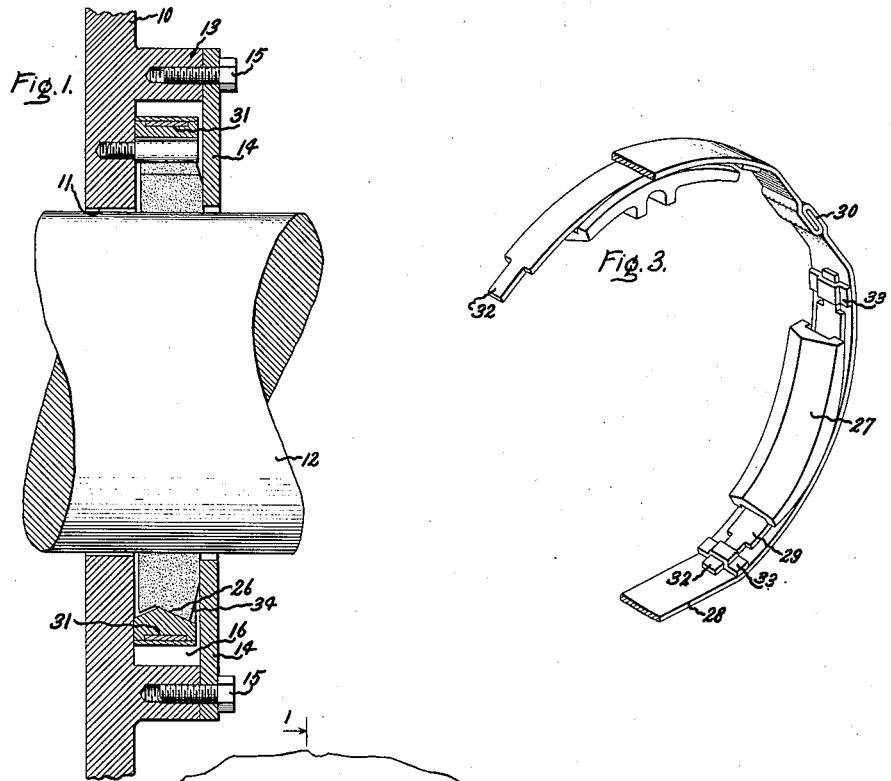
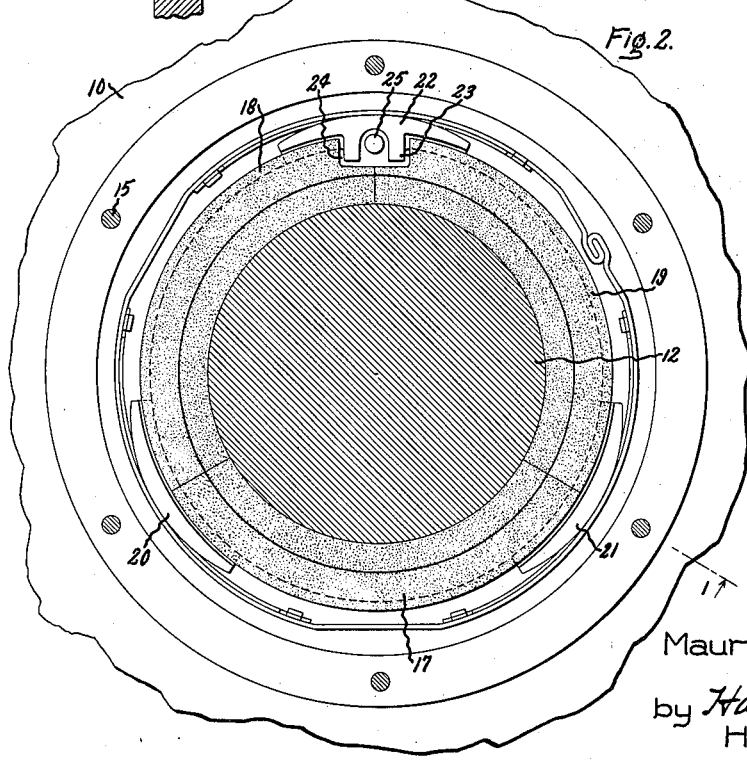
Inventor:
Maurice E. Norton,
by Harry E. Dunham
His Attorney.

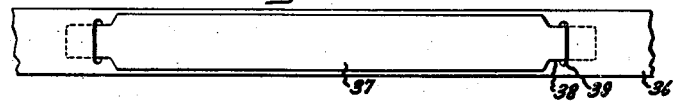
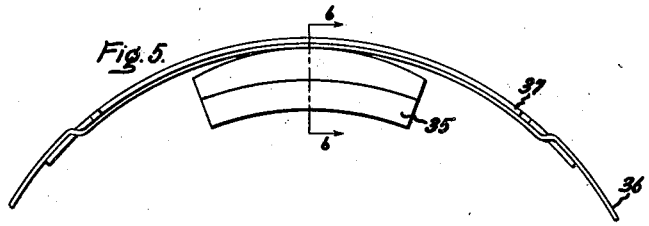
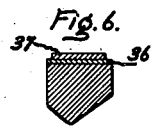
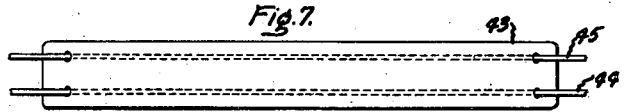
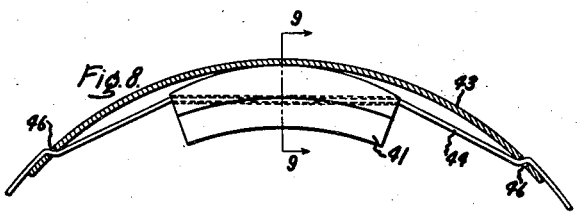
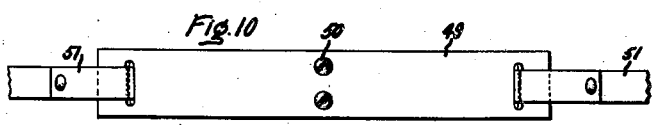
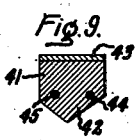
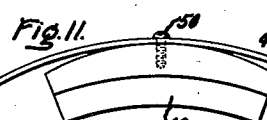
Inventor:
Maurice E. Norton,
by Harry E. Dunham
His Attorney.

Patented Jan. 14, 1941

2,228,841

UNITED STATES PATENT OFFICE 2,228,841

PACKING ARRANGEMENT

Maurice E. Norton, Marblehead, Mass., assignor to General Electric Company, a corporation of New York Application May 26, 1939, Serial No. 275,857

9 Claims. (Cl. 286—24)

The present invention relates to packing arrangements in which a packing ring formed of a plurality of segments is held in position and biased into sealing engagement with a shaft by means including blocks bridging end portions of adjacent segments. Such arrangements are used, for example, to seal the shaft of an elastic fluid turbine to the casing thereof in order to prevent leakage of elastic fluid along the shaft past the casing. An arrangement of this kind is disclosed in the application of L. B. Wales, Serial No. 214,256, filed June 17, 1938, and assigned to the same assignee as the present application.

The object of my invention is to provide an improved construction and arrangement of packings whereby the segments of a ring are held in archbound relation and biased towards a sealing wall by relatively simple and inexpensive means.

For a consideration of what I believe to be novel and my invention, attention is directed to the following description and the claims appended thereto in connection with the accompanying drawings.

In the drawings Fig. 1 illustrates a sectional view of a packing arrangement embodying my invention; Fig. 2 is a front view of a part of Fig. 1, Fig. 1 being a sectional view along line 1—1 of Fig. 2; Fig. 3 is a perspective view of a part of Figs. 1 and 2; Fig. 4 is a top view of a modification of my arrangement; Fig. 5 is a side view of Fig. 4; Fig. 6 is a sectional view along line 6—6 of Fig. 5; Fig. 7 is a top view of another modification of my invention; Fig. 8 is a side view partly in section of Fig. 7; Fig. 9 is a section along line 9—9 of Fig. 8; Fig. 10 is a top view of another modification of my invention; and Fig. 11 is a side view of Fig. 10.

The arrangement shown in Figs. 1 to 3 comprises a turbine casing 10 having an opening 11 through which a shaft 12 projects. The casing 10 has an annular projection 13 to which an end plate 14 is fastened by means of bolts 15 to form a packing or sealing chamber 16. A segmental packing ring comprising in the present example three segments 17, 18 and 19 is located in the chamber 16 with its inner cylindrical surface in sealing engagement with the shaft 12. In this position the end faces of adjacent segments engage each other. In other words, the segments are in archbound relation. They are maintained in this relation by means including three blocks 20, 21 and 22, each block bridging end portions of two adjacent segments. Thus, the block 20 bridges the end portions of the segments 17 and 18 while the block 22 bridges the end portions of the segments 18 and 19. The segments 20 and 21 are alike, whereas the segment 22 forms a forked projection 23 located in a recess 24 formed by the end portions of the segments 18 and 19. A pin 25 secured to the casing 10 is located between the prongs of the forked projection 23 and prevents or limits rotary movement of the packing relative to the casing. The outer surface of the packing ring forms a groove 26 which is V-shaped in cross section. The inner surface of each block is likewise V-shaped, thus forming a V-shaped portion 27 for each block, which portion is located in the V-shaped groove of the packing ring and arranged to engage one side of the V-shaped groove.

The blocks are biased radially towards the segments by means including an outer band 28 and a flat spring 29 for each block. The outer band has end portions 30 suitably connected together to form a holding ring for the springs. The flat springs are located in recesses 31 formed in the outer surfaces of the blocks and the flat springs have end portions 32 reduced in axial width and connected to the band 28 by means of clips 33. The grooves 31 in the outer surfaces of the blocks prevent axial movement of the springs 29 and the clips 33 limit circumferential movement of the springs 29.

In such arrangement the biasing force exerted on the blocks by the flat springs has a component biasing the ring towards the shaft or, from another viewpoint, biasing the segments towards each other to maintain them in arch-bound relation floating on the shaft, and said force has another component acting in axial direction to bias the packing ring towards a sealing wall which, in the present instance, is formed by the end plate 14. To maintain good sealing contact between the end wall and the packing ring, the outer face 34 of the packing ring is cut away or chamfered, thus reducing the radial width of said sealing surface and increasing the sealing contact between the ring and the end plate 14. The face of the sealing blocks axially opposite the sealing face of the packing ring engages the adjacent surface of the casing 10. The centers of the V-shaped groove in the packing ring and the V-shaped projections of the blocks are out of line, as shown in Fig. 1, to assure sealing contact between the outer face of the packing ring and the end plate 14 as the packing ring wears during operation.

The modification in Figs. 4 to 6 shows a different arrangement of the band and the springs.

It comprises a segment 35 with an outer cylindrical surface engaged by a closed band or ring 36 corresponding to the band 28 of Fig. 1. A flat spring 37 engages the outer surface of the band 36 and has reduced end portions 38 projecting into slots 39 of the band 36. Thus, in this arrangement the band is located between a segment and a spring, whereas in the arrangement of Fig. 1 each spring is located between a segment and the band.

The arrangement of Figs. 7, 8 and 9 comprises a block 41 with a V-shaped portion 42 corresponding to the V-shaped portions 27 of Figs. 1 to 3 for projecting into the V-shaped groove of a packing ring. The outer surface of the block 41 is engaged by a flat spring 43. The spring is biased towards the block 41 and held in position relative thereto by means of two wires 44, 45 which have end portions connected together similar to the connection of the band 28 in Figs. 2 and 3 and project through openings formed in the block 41 and openings 46 formed in end portions of the band 43.

The arrangement of Figs. 10 and 11 comprises a block 48 for bridging two segments of a packing ring and corresponding to blocks 20 to 22 of Fig. 2. The means for biasing the blocks towards the segments to hold the latter in archbound relation comprises a flat spring 49 for each block secured thereto by means of screws 50. The spring 49 is biased towards the segments by means of links 51 connecting the ends of adjacent springs. Thus the springs 49 and the links 51 in such an arrangement form a continuous band which is securely attached to the blocks.

Thus, with my invention I have accomplished an improved construction and arrangement of packings whereby a segmental packing ring is effectively held in archbound relation and in sealing engagement with a rotary shaft and with the sealing surface formed by the wall of a packing chamber defined by a housing which has spaced first and second walls. The first wall forms a sealing surface engaged by the packing ring. The packing ring forms an outer groove V-shaped in cross section for engagement with V-shaped projections of a plurality of blocks. These blocks are biased towards the packing ring and towards the second wall by flat springs held in position by an endless band or wire. Only one side of the V-shaped groove is engaged by the blocks, more particularly by one side of the V-shaped projections of the blocks. From this viewpoint my packing arrangement comprises a packing ring which has an outer conical surface engaged by the inner conical surfaces of a plurality of circumferentially spaced blocks.

Having described the method of operation of my invention, together with the apparatus which I now consider to represent the best embodiment thereof, I desire to have it understood that the apparatus shown is only illustrative and that the invention may be carried out by other means.

What I claim as new and desire to secure by Letters Patent of the United States is:

1. A packing arrangement including a housing having spaced first and second walls forming a chamber, a packing ring located in the chamber and engaging the first wall, said ring having a plurality of segments engaging each other along radial planes and with an outer surface forming a groove V-shaped in cross section, a plurality of blocks, each block bridging the end portions of a pair of adjacent segments and having a V-shaped portion projecting into and engaging one side only of said groove and the second wall, and means biasing the blocks towards the segments to maintain them in archbound relation.

2. A packing arrangement including a housing having spaced first and second walls forming a chamber, a packing ring located in the chamber and engaging the first wall, said ring having a plurality of segments engaging each other along radial planes and with an outer surface forming a groove V-shaped in cross section, a plurality of blocks, each block bridging the end portions of a pair of adjacent segments and having a V-shaped portion for engaging one side only of said groove and the second wall, and means biasing the blocks towards the segments to maintain them in archbound relation, said biasing means comprising a band having ends fastened together and surrounding the blocks and a flat spring between each block and the band.

3. A packing arrangement including a housing having spaced first and second walls forming a chamber, a packing ring located in the chamber and engaging the first wall, said ring having a plurality of segments engaging each other along radial planes and with an outer surface forming a groove V-shaped in cross section, a plurality of blocks having outer circumferentially extending recesses, each block bridging end portions of a pair of adjacent segments and having a V-shaped portion engaging one side only of said groove and the second wall, and means biasing the blocks towards the segments and the segments towards the first wall, said means comprising flat springs located in said recesses and a band having ends fastened together and surrounding the flat springs and limiting movement thereof.

4. A packing arrangement including a housing having spaced first and second walls forming a chamber, a packing ring located in the chamber and engaging the first wall, said ring having a plurality of segments engaging each other along radial planes and with an outer conical surface, a plurality of blocks, each block bridging the end portions of a pair of adjacent segments and having an inner conical surface contacting one side only of said outer conical surface, and means including a flat spring for each block and a support for the springs to bias the blocks towards the segments and the segments axially towards the first wall.

5. A packing arrangement including a packing ring having a plurality of segments with an outer conical surface, a plurality of blocks, each block bridging the end portions of a pair of adjacent segments and having an inner conical surface contacting said outer conical surface, and means including a flat spring for each block and a support for the springs to bias the blocks towards the segments, one of the blocks having a forked portion projecting radially into a recess formed by the segments for cooperation with a stationary pin to limit movement of the ring.

6. A packing arrangement including a packing ring having a plurality of segments with an outer conical surface, a plurality of blocks, each block bridging the end portions of a pair of adjacent segments and having an inner conical surface engaging said outer conical surface, and means biasing the blocks towards the segments, said means comprising a band having slots surrounding the segments and having ends fastened together and a flat spring for each block engaging the outer surface of the band the end portions of the springs projecting through the slots and engaging the inner surface of the band.

7. A packing arrangement including a packing ring having a plurality of segments with an outer conical surface, a plurality of blocks, each block bridging the end portions of a pair of adjacent segments and having an inner conical surface engaging said outer conical surface, and means biasing the blocks towards the segments, said means comprising a flat spring for each block engaging the outer surface thereof and a wire biasing the springs towards the blocks and holding them in position, said wire projecting through openings in the blocks and through openings in the ends of the spring, the ends of the wire being fastened together.

8. A packing arrangement including a packing ring having a plurality of segments, a plurality of circumferentially spaced blocks engaging the outer surface of the segments, and means biasing the blocks towards the segments comprising a flat spring for each block engaging the outer surface thereof and links connecting the ends of the flat springs.

9. A packing arrangement including a housing having spaced first and second walls forming a chamber, a packing ring located in the chamber and engaging the first wall, said ring having a plurality of segments, end portions of adjacent segments having an outer surface with a circumferentially extending groove V-shaped in cross section, a plurality of blocks, each block having an inner portion V-shaped in cross-section and projecting into one of the grooves with one side only of the V-shaped portion engaging one side only of the V-shaped groove and the other sides of the V-shaped portion and the V-shaped groove being slightly spaced, and means including flat springs to bias the blocks radially towards the segments and the segments axially towards the first wall.

MAURICE E. NORTON.